B. J. FALK.
HOLDER FOR VIEWING TRANSPARENCIES.
APPLICATION FILED JAN. 28, 1915.
1,152,156.
Patented Aug. 31, 1915.
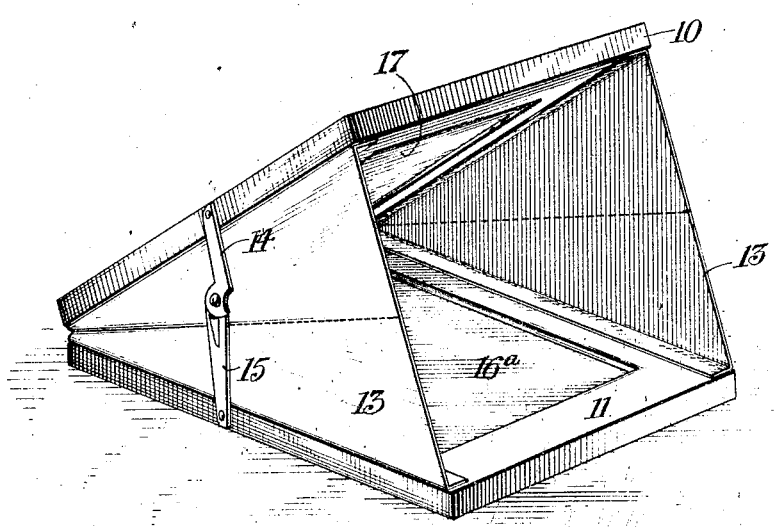
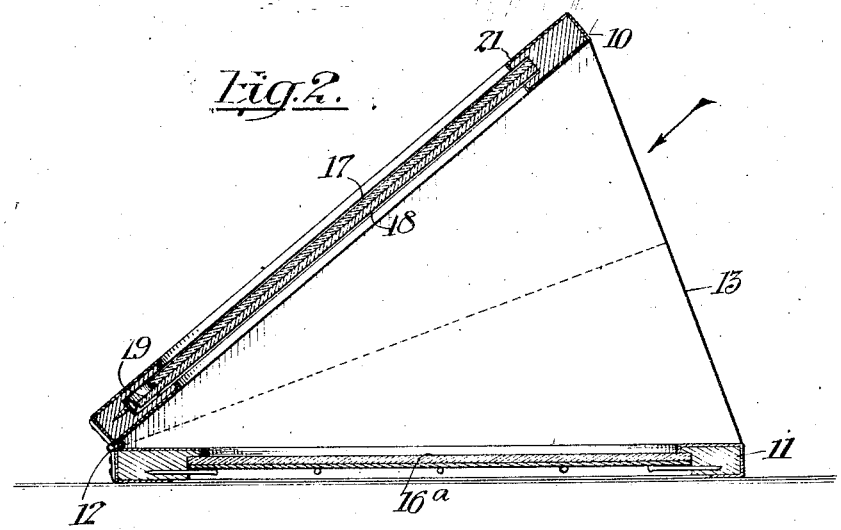

UNITED STATES PATENT OFFICE.

BENJAMIN J. FALK, OF NEW YORK, N. Y.

HOLDER FOR VIEWING TRANSPARENCIES.

1,152,156.  Specification of Letters Patent.  Patented Aug. 31, 1915.

Application filed January 28, 1915. Serial No. 4,811.

*To all whom it may concern:*

Be it known that I, BENJAMIN J. FALK, a citizen of the United States, and resident of New York city, in the county of New York and State of New York, have invented certain new and useful Improvements in Holders for Viewing Transparencies, of which the following is a specification.

In the making of the transparencies by color photography, it often happens that the correct combination of colors and the correct tone or shade has not been secured and therefore the complete picture often has a more or less pronounced excess of some particular color, and the picture does not appear true to nature or to the original from which the transparency was made. Furthermore, different kinds of artificial light have different predominating colors and colored transparencies which will appear in the correct color and tone when viewed by daylight, will not appear right when viewed by artificial light.

The main object of my invention is to provide means whereby the deficiency or excess of the particular color in the transparency when viewed by day-light may be counteracted or corrected, and whereby the transparency may be adapted as far as possible to be viewed when illuminated by any particular character of artificial light.

Reference is to be had to the accompanying drawings in which similar reference characters indicate corresponding parts in both of the views, in which, Figure 1 is a perspective view of one form which may be employed for supporting the transparency and permitting it to be viewed to give the proper effect and Fig. 2 is a vertical longitudinal section of a similar device, but provided with a separate color screen.

In the specific form illustrated in Figs. 1 and 2, I provide two frames 10 and 11 pivotally connected together by a suitable hinge 12 or other device 12 and having triangular side walls 13, 13. These latter are preferably of fabric and designed to fold inwardly as the frames swing toward each other although they may be of sheet metal if desired. For limiting the movement of the frames away from each other and for holding them at substantially the angle shown, the two frames are connected by two pairs of pivoted links 14 and 15 of any suitable character. The frame 11 normally serves as a base and carries a mirror 16ᵃ with a suitable reflecting surface, while the other frame 10 carries the transparency 17 which, for the present purposes, will be considered as a positive on glass and showing some person, object or scene photographed in the natural colors. The color transparency is preferably inserted in the frame in inverted position so that when the mirror is held in horizontal position and viewed by a person, looking in the direction of the arrow, between the two side walls 13, 13, the picture will appear right side up in the mirror.

As previously stated, the main object of my invention is to secure the proper color effect in the transparency and to counteract deficiency or excess in any one color or tint. To do this, I provide a sheet or layer of color medium disposed in the line of vision between the observer and the source of light. I avoid the necessity of using a separate color screen and at the same time avoid adding to the weight of the device by combining the mirror and the color screen. The pigment may be applied to the upper or reflecting surface of the mirror or may be incorporated in the material forming the mirror, or may be embodied in any other suitable manner so as to come in the line of vision between the observer and the source of light. If the pigment be incorporated in or applied to the mirror, or be so disposed that the light rays in passing from the source of light through the transparency to the reflecting surface and then upwardly to the observer, pass through the color medium both before and after striking the reflecting surface, a color medium of only one-half the density or thickness need be employed from what would be necessary if the light rays only passed through the pigment layer or color screen once.

In Fig. 2, I have shown a construction somewhat similar to that shown in Fig. 1 except that instead of having a combined color screen and mirror 16, I employ an ordinary mirror 16ᵃ. I have shown a separate color screen in the form of a sheet of glass 18 which may have a thin coating of the desired color medium thereon or may have the pigment incorporated in the glass. Preferably, the screen is secured to the frame 10 so as to form a permanent part of the device and permit different transparencies to be placed therein. The transparency may be removed from the frame by sliding it downwardly against a small leaf spring 19 until its upper edge comes out of a socket at the upper end of the frame. Preferably the retaining flange 21 which extends across the upper edge, does not extend across the side edges, so that the transparency may be swung upwardly out of the frame when moved downwardly against the spring to a sufficient extent to bring it out of the pocket at the upper edge of the frame. Preferably this color screen is placed below the transparency and secured in place, but it is of course evident that the screen may be removable and as far as the corrective effect is concerned, the screen might be above instead of below the transparency.

Although I have shown the screen in the form of a glass plate embodying or carrying the pigment, it is of course evident that a celluloid or gelatinous screen of the desired color might be employed. The character, as well as the degree, of coloring in the screen or mirror may be varied in accordance with the character of the transparency, the result which it is desired to produce, or the condition or character of the source of light used as the illuminating means. The mirror itself may be polished metal plate of the desired color.

The light rays from the source of light will pass downwardly through the transparency and the color screen to the mirror and thence be reflected upwardly to the observer who will look at the mirror in the direction indicated by the arrow.

It is evident that by selecting a color screen of the proper color, shade or tint, in respect to the character of the artificial light employed, I may cause a transparency which when alone appears in the true and correct colors by day-light, to also appear in the true and correct colors by artificial light.

By having the device itself made up with a screen made to counteract the effect of the particular kind of artificial light used by the owner of the device, he may view or show his transparencies at night to equally as good advantage as he could in the day time. Conversely, transparencies which do not appear true by day-light but which are intended to be used in connection with an artificial light of a particular color so that when viewed with said artificial light they appear true, can be viewed in day-light with my improved device by employing a screen or colored mirror of the same color as that of the artificial light with which the transparency was designed to be used.

Having thus described my invention, what I claim as new and desire to secure by Letters Patent is:

A device for viewing color transparencies, comprising a base presenting an upwardly facing, approximately horizontal colored mirror, and a frame for supporting the transparency at an angle to said base and extending upwardly and over said mirror from one edge thereof, the color of the mirror being such in respect to the color of the transparency that the transparency, when viewed in the mirror, by light rays passing through the transparency, will appear in the proper colors irrespective of color deficiencies in the transparency or in the source of light.

Signed at New York city, in the county of New York and State of New York, 26th of January, A. D. 1915.

BENJAMIN J. FALK.

Witnesses:
CHAS. A. JACOBSEN,
CLAIR W. FAIRBANK.